(12) United States Patent
Huber

(10) Patent No.: US 7,335,423 B2
(45) Date of Patent: *Feb. 26, 2008

(54) BLENDS COMPOSED OF STYRENE-BUTADIENE BLOCK COPOLYMERS AND OF POLYOLEFINS FOR TRANSPARENT, ELASTIC FILMS

(75) Inventor: Robert Huber, Limburgerhof (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 195 days.

This patent is subject to a terminal disclaimer.

(21) Appl. No.: 11/160,241

(22) Filed: Jun. 15, 2005

(65) Prior Publication Data

US 2005/0282965 A1    Dec. 22, 2005

(30) Foreign Application Priority Data

Jun. 17, 2004   (DE)   ................ 10 2004 029 132

(51) Int. Cl.
*B32B 27/00* (2006.01)

(52) U.S. Cl. .............. 428/500; 428/515; 428/516; 428/517; 428/521; 428/523

(58) Field of Classification Search .......... 428/500, 428/515, 516, 517, 521, 523
See application file for complete search history.

(56) References Cited

U.S. PATENT DOCUMENTS

| 4,479,989 | A | | 10/1984 | Mahal |
| 5,972,519 | A | * | 10/1999 | Niessner et al. ......... 428/474.4 |
| 6,031,053 | A | | 2/2000 | Knoll et al. |
| 6,124,428 | A | | 9/2000 | Schmieg et al. |
| 6,197,889 | B1 | | 3/2001 | Knoll et al. |
| 6,470,654 | B1 | | 10/2002 | Lachenmeier et al. |

FOREIGN PATENT DOCUMENTS

| EP | 1 201 406 A1 | 5/2002 |
| WO | WO-96/23823 A1 | 8/1996 |
| WO | WO-03/062062 A1 | 7/2003 |

OTHER PUBLICATIONS

English-Language translation of International Patent Publication # WO 96/23823, published Aug. 8, 1996, Inventors: Niessner et al., Applicant BASF Aktiengesellschaft, Title: Flexible, Transparent Styrene Polymer-Based Foil, in Particular For Food Packaging, and Process for Its Production.

* cited by examiner

Primary Examiner—Leszek Kiliman
(74) Attorney, Agent, or Firm—Connolly Bove Lodge & Hutz LLP

(57) ABSTRACT

A polymer film, comprising from 1 to 20% by weight of a thermoplastic elastomer based on styrene (S-TPE) from 80 to 99% by weight of a polyolefin.

18 Claims, No Drawings

BLENDS COMPOSED OF STYRENE-BUTADIENE BLOCK COPOLYMERS AND OF POLYOLEFINS FOR TRANSPARENT, ELASTIC FILMS

The invention relates to a polymer film, comprising
A) from 1 to 20% by weight of a thermoplastic elastomer based on styrene (S-TPE)
B) from 80 to 99% by weight of a polyolefin.

Packaging films are often produced from polyolefins. In order to permit production of thinner films, it would be desirable to increase the tensile strain at break, tear propagation resistance, and puncture resistance of polyolefin film.

Styrene-butadiene-styrene block copolymers with appropriate butadiene contents exhibit very good tensile strain at break, but the butadiene block can cause crosslinking and fish-eye formation. U.S. Pat. No. 5,972,519 and WO 96/23823 describe flexible, transparent films composed of styrene-butadiene block copolymers having a random styrene-butadiene copolymer block, for food packaging.

It is an object of the present invention to provide films which have a low fish-eye level and have high longitudinal and transverse tensile strain at break, and which even when film thicknesses are low, have adequate puncture resistance and good tear propagation resistance.

Accordingly, the polymer film described at the outset has been found. The polymer film preferably comprises
A) from 3 to 5% by weight of a thermoplastic elastomer based on styrene (S-TPE)
B) from 95 to 97% by weight of a polyolefin.

Component A

The S-TPE preferably has tensile strain at break of more than 300%, particularly preferably more than 500%, in particular more than 600%, measured to ISO 527, and the amount of this material admixed is from 1 to 20% by weight, preferably from 3 to 5% by weight, based on the polystyrene molding composition. The S-TPE more preferably used for admixing comprises a linear or star-shaped styrene-butadiene block copolymer with external polystyrene blocks S and, between these, styrene-butadiene copolymer blocks with random styrene/butadiene distribution $(S/B)_{random}$, or with a styrene gradient $(S/B)_{taper}$.

The total butadiene content is preferably in the range from 15 to 50% by weight, particularly preferably in the range from 25 to 40% by weight, and the total styrene content is accordingly preferably in the range from 50 to 85% by weight, particularly preferably in the range from 60 to 75% by weight.

The styrene-butadiene block (S/B) is preferably composed of from 30 to 75% by weight of styrene and from 25 to 70% by weight of butadiene. A block (S/B) particularly preferably has a butadiene content of from 35 to 70% by weight and a styrene content of from 30 to 65% by weight.

The proportion of the polystyrene blocks S is preferably in the range from 5 to 40% by weight, in particular in the range from 25 to 35% by weight, based on the entire block copolymer. The proportion of the copolymer blocks S/B is preferably in the range from 60 to 95% by weight, in particular in the range from 65 to 75% by weight.

Particular preference is given to linear styrene-butadiene block copolymers of the general structure S-(S/B)-S having, situated between the two S blocks, one or more $(S/B)_{random}$ blocks having random styrene/butadiene distribution. These block copolymers are obtainable via anionic polymerization in a non-polar solvent with addition of a polar cosolvent or of a potassium salt, as described by way of example in WO 95/35335 or WO 97/40079.

Vinyl content is the relative proportion of 1,2-linkages of the diene units, based on the entirety of 1,2-, 1,4-cis and 1,4-trans linkages. The 1,2-vinyl content in the styrene-butadiene copolymer block (S/B) is preferably below 20%, in particular in the range from 10 to 18%, particularly preferably in the range from 12 to 16%.

Component B

Examples of suitable component B are semicrystalline polyolefins, such as homo- or copolymers of ethylene, propylene, 1-butene, 1-pentene, 1-hexene, 4-methyl-1-pentene, and also ethylene copolymers with vinyl acetate, vinyl alcohol, ethyl acrylate, butyl acrylate, or methacrylate. Component B is preferably a high-density polyethylene (HDPE), low-density polyethylene (LDPE), linear low-density polyethylene (LLDPE), polypropylene (PP), ethylene-vinyl acetate copolymer (EVA), or ethylene-acrylic copolymer.

The inventive polymer film may also comprise the usual auxiliaries and additives, such as lubricants, antiblocking agents, release agents, stabilizers, antistatic agents, flame retardants, colorants, etc.

The inventive polymer film may also have a multilayer structure, where at least one layer is composed of components A and B. The other layers may be composed of the polyolefins stated under component B or of mixtures thereof.

The total film thickness of the inventive polymer film is generally in the range from 1 to 250 µm, and the thickness of the polymer film is preferably in the range from 10 to 150 µm.

The inventive polymer film may be produced by suitable processes, such as mono- and coextrusion to give tubular films, chill-roll films, or other extruded films, or by calendering, injection molding, or blow molding.

When the inventive polymer film is compared with films composed exclusively of polyolefin, it has substantially higher tensile strain at break and/or puncture resistance. It is therefore possible to produce films with low film thickness and adequate toughness.

EXAMPLES

Starting Materials:

LDPE: Trithene TX 8079, low-density polyethylene from Triunfo (density 0.925 g/cm$^3$, MFR (190° C./2.16 kg) 0.3 g/10 min)

LLDPE Trithene TS 7003 linear low-density polyethylene from Triunfo (density 0.923 g/cm$^3$, MFR (190° C./2.16 kg) 0.3 g/10 min)

SB Styroflex® 2G66 (thermoplastic elastomer based on a styrene-butadiene block copolymer having a random S/B middle block from BASF Aktiengesellschaft)

Test Methods:

The test specimens for the mechanical tests were cut out longitudinally and transversely from the films. Modulus of elasticity, tensile stress at break, and tensile strain at break were determined in the ISO 527-2 tensile test.

The puncture resistance test was carried out in accordance with the proposed standard FNK 403.3.

Production of Films:

The single-layer (F1, CF1) and multilayer (F2, CF2) films were produced via blown-film extrusion. The composition and properties of the inventive films F1 and F2 and of the comparative films CF1 and CF2 are given in tables 1 and 2.

Although film thickness is lower in the inventive film F1, it exhibits markedly higher tensile strain at break and tensile stress. The micrograph shows fine dispersion of the SB polymer in the form of fine droplets. Although the thickness of the inventive film F2 is markedly lower it exhibits higher tensile stress.

TABLE 1

|  | CF1 (LDPE/ LLDPE 70/30) | F1 (LDPE/ LLDPE/SB (68/29/3) |
|---|---|---|
| Film thickness [µm] | 98 | 93 |
| Modulus of elasticity [Mpa] (l/p) | 205/226 | 186/202 |
| Tensile stress (max.) [MPa] (l/p)] | 21.3/22.9 | 23.8/25.7 |
| Tensile strain at break [%] (l/p) | 612/482 | 687/597 |
| Puncture force [N] | 6.8 | 6.7 |
| Puncture strain [mm] | 9.3 | 9.9 |

TABLE 2

|  | CF2 coextrusion film AAA (LDPE 100) | F2 coextrusion film ABA LDPE 10 µm/LDPE/ SB (50/50) 5 µm/LDPE 10 µm |
|---|---|---|
| Film thickness [µm] | 56 | 25 |
| Modulus of elasticity [Mpa] (l/p) | 167/189 | 127/168 |
| Tensile stress (max.) [MPa] (l/p)] | 19.7/19.9 | 21.8/20.6 |
| Tensile strain at break [%] (l/p) | 249/496 | 179/435 |
| Puncture force [N] | 4.9 | 3.5 |
| Puncture strain [mm] | 9.3 | 11.6 |

What is claimed as new and desired to be protected by Letters Patent of the United States is:

1. A polymer film comprising
   A) from 3 to 5% by weight of a thermoplastic elastomer based on styrene (S-TPE) and
   B) from 95 to 97% by weight of a polyolefin.

2. The polymer film according to claim 1, wherein component A) is a styrene-butadiene block copolymer of S-(S/B)-S structure, where S is a polystyrene block and S/B is a styrene-butadiene copolymer block.

3. The polymer film according to claim 1, wherein component A) is composed of from 15 to 50% by weight of butadiene and from 50 to 85% by weight of styrene.

4. The polymer film according to claim 2, wherein the styrene-butadiene copolymer block S/B of component A) has random distribution of the styrene units and butadiene units.

5. The polymer film according to claim 2, wherein the styrene-butadiene copolymer block (S/B) of component A) is composed of from 30 to 70% by weight of styrene and from 25 to 70% by weight of butadiene.

6. The polymer film according to claim 2, wherein the proportion of the polystyrene blocks S is in the range from 5 to 40% by weight.

7. The polymer film according to claim 2, wherein the 1,2-vinyl content in the styrene-butadiene copolymer block (S/B) of component A) is below 20%.

8. The polymer film according to claim 1, which comprises, as polyolefin, a high-density polyethylene (HDPE), low-density polyethylene (LDPE), linear low-density polyethylene (LLDPE), polypropylene (PP), ethylene-vinyl acetate copolymer (EVA), or ethylene-acrylic copolymer.

9. The polymer film according to claim 1, whose thickness is in the range from 1 to 250 µm.

10. A multilayer film comprising at least one layer composed of a polymer film according to claim 1.

11. A multilayer film comprising at least one layer composed of a polymer film according to claim 2.

12. A multilayer film comprising at least one layer composed of a polymer film according to claim 3.

13. A multilayer film comprising at least one layer composed of a polymer film according to claim 4.

14. A multilayer film comprising at least one layer composed of a polymer film according to claim 5.

15. A multilayer film comprising at least one layer composed of a polymer film according to claim 6.

16. A multilayer film comprising at least one layer composed of a polymer film according to claim 7.

17. A multilayer film comprising at least one layer composed of a polymer film according to claim 8.

18. A multilayer film comprising at least one layer composed of a polymer film according to claim 9.

* * * * *